Dec. 14, 1943.    R. LO VICO    2,336,490
PRE-SET PRESSURE CAN FOR FROZEN FOOD OR THE LIKE
Filed July 25, 1940    2 Sheets-Sheet 1

INVENTOR
Rosario Lo Vico
BY
ATTORNEY

Dec. 14, 1943.   R. LO VICO   2,336,490
PRE-SET PRESSURE CAN FOR FROZEN FOOD OR THE LIKE
Filed July 25, 1940    2 Sheets-Sheet 2
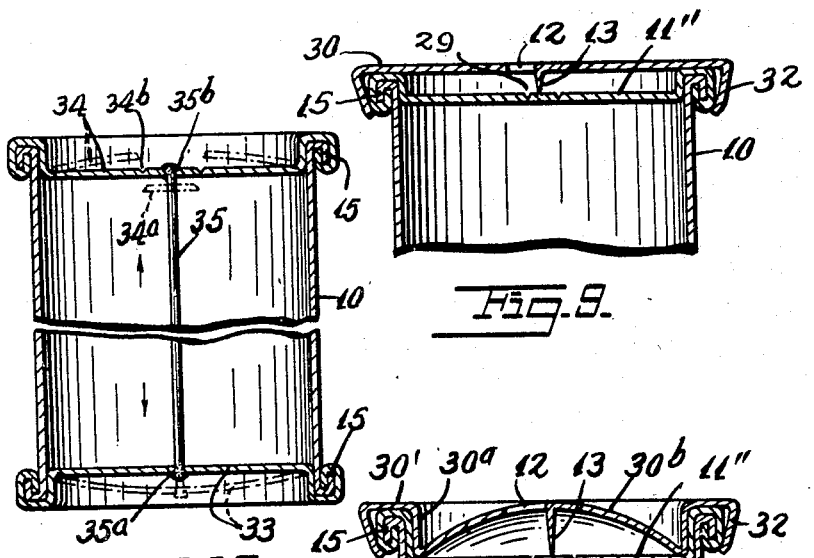
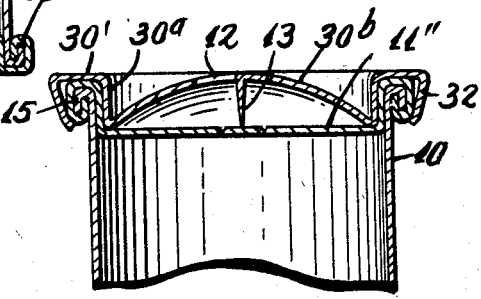
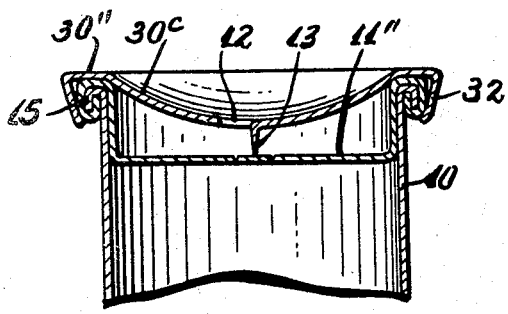
INVENTOR
Rosario Lo Vico
BY
ATTORNEY Patented Dec. 14, 1943

2,336,490

UNITED STATES PATENT OFFICE 2,336,490

PRESET PRESSURE CAN FOR FROZEN FOOD OR THE LIKE

Rosario Lo Vico, Astoria, Long Island, N. Y.

Application July 25, 1940, Serial No. 347,368

2 Claims. (Cl. 220—89)

This invention relates to new and useful improvements in a pre-set pressure can for frozen foods or the like.

The invention proposes a construction of a can as mentioned which is characterized by a can intended to be hermetically sealed and having a wall formed with an opening, and a sharp prong adjacent said opening and extending inwards, and a flexible seal mounted on the inner face of the wall across said opening and engaging said prong and adapted to be punctured by the prong when the pressure in the sealed can increases to a predetermined amount.

The invention is particularly intended for cans in which frozen food is packed. Such frozen foods produce gases which reach pressures above five pounds per square inch when they spoil due to decomposition, changes in temperature, or other causes. The feature of the invention resides in the fact that a person may examine the can before using, and if the seal has been punctured by the prong it is known that the canned food should not be used.

Still further the invention proposes a novel construction whereby it is possible to control the puncturing of the seal at predetermined selected pressures.

Still further the invention proposes to so arrange the pre-set pressure can that the internal pressure is controlled by the sharpness or the bluntness of the prong which punctures the seal. It is also realized that other methods of controlling the pre-set pressure are possible.

In one modified form of the invention score lines are proposed for dividing off the area of the wall which is to be punctured in a way as to control the internal pressure. In another form of the invention an annular tubular wall with sharpened edges is proposed to engage the seal for cutting the seal when the internal pressure of the can increases above a predetermined amount.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figs. 9, 10 and 11 are similar views to Fig. 2, but illustrating various modified forms of the invention.

Fig. 12 is another vertical sectional view, illustrating a still further modification of the invention.

Figure 1:
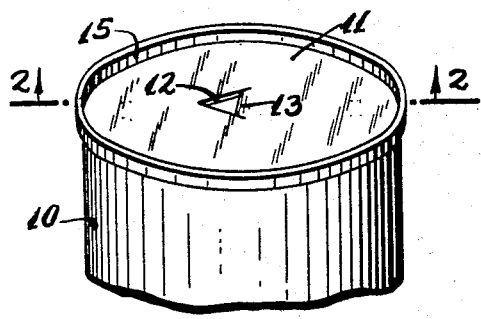
Figure 1 is a perspective view of a pre-set pressure can for frozen foods constructed in accordance with this invention.
Figure 2:
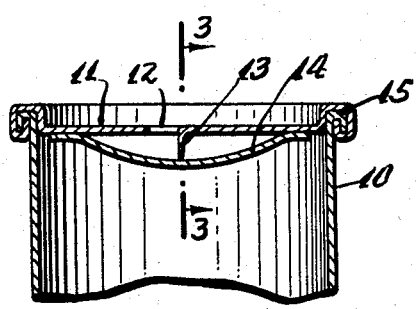
Fig. 2 is a fragmentary vertical sectional view taken on the line 2—2 of Fig. 1.

The pre-set pressure can for frozen foods or the like, according to this invention, includes a can 10 intended to be hermetically sealed and having a wall 11 formed with an opening 12 and a sharp prong 13 adjacent said opening and extending inwards. A flexible seal 14 is mounted upon the inner face of the wall 11 and across the opening 12 and engages against the prong 13 and is adapted to be punctured by the prong when the pressure in said sealed can increases to a predetermined amount.

The prong 13 is stamped from the material of the wall 11 forming the opening 12. The wall 11 comprises the cover for the can. It is mounted upon the can by the usual double seam joint 15. The seal 14 preferably comprises a sheet of thin metal or other suitable material which is attached at its edge portions 14ª to the underface of the wall 11.

In use the frozen foods are stored in the can in usual way. In the event that the food spoils and becomes poisonous, gases will be liberated by the foods and this increases the pressure within the can. Since there is atmospheric pressure above the seal 14, the seal will move upwards against the prongs 13 until the prong punctures the seal. Before the food is used the seal must be examined and if it is found to be punctured the contents of the can should be destroyed.

Figure 4:
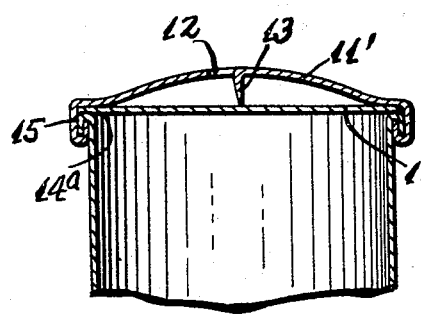
Fig. 4 is a transverse vertical sectional view of a pre-set pressure can for frozen foods or the like constructed in accordance with another form of this invention.

In Fig. 4 a modified form of the invention has been disclosed which distinguishes from the prior form in the fact that the seal 14' is of straight material having its edge portions 14ª clamped in between the edge portions of the cover wall 11' and the edge wall of the can 10, at the double seam 15. The cover wall 11' is curved upwards so that the prong 13 which is stamped therefrom rests against the top face of the seal 14. In other respects this form of the invention is similar to the previous form and like parts are identified by like reference numerals.

Figure 5:
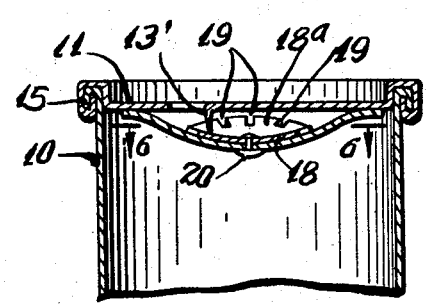
Fig. 5 is another fragmentary vertical sectional view of another can constructed in accordance with another form of this invention.
Figure 3:
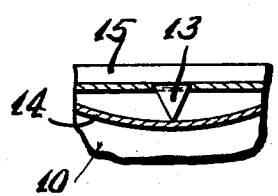
Fig. 3 is a fragmentary transverse vertical sectional view taken on the line 3—3 of Fig. 2.
Figure 6:
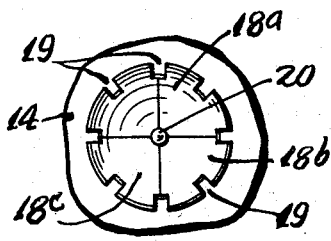
Fig. 6 is a fragmentary horizontal sectional view taken on the line 6—6 of Fig. 5.

In Figs. 5 and 6 another embodiment of the invention is disclosed which distinguishes from the prior forms in the fact that a sheet metal member 18 is movably mounted on the seal 14 and has different areas 18ª, 18ᵇ, 18ᶜ, etc., of different hardness adapted to be selectively engaged beneath the prong 13'. The prong 13' is stamped from the material of the wall 11. However, it is offset from the center.

The member 18 is of circular formation. A pintle rivet 20 is fixedly and hermetically mounted through the seal 14 and pivotally supports the movable member 18. The member 18 has several notches 19 upon its periphery into which a pointed implement may be engaged for turning it. The arrangement is such that the member 18 may be turned to place a selected portion 18ª, 18ᵇ, 18ᶜ, etc. beneath the prong 13'. In this manner it is possible to cause the prong 13' to puncture the member 18 and the seal 14 at predetermined pressures. For example, the arrangement may be such that the puncturing may take place with an internal pressure in the can of five pounds per square inch, or of six pounds per square inch, etc. The can may be designed to work at other pressures. In other respects this form of the invention is similar to the previous forms.

Figure 7:
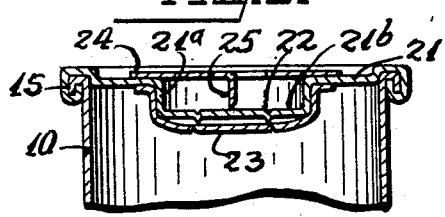
Fig. 7 is a fragmentary vertical sectional view of a can constructed in accordance with another modification of this invention.

In the modified form of the invention disclosed in Fig. 7 the pre-set pressure can or the like includes a can 10 intended to be hermetically sealed and having a wall 21 provided with a cylindrical recessed portion 21ª having a base wall 21ᵇ which is provided with an annular score 22 which divides off a circular area. The area within the score line 22 is a weakened area which may be severed when the internal pressure of the can rises above a predetermined amount. A seal 23 of tin-foil, or other material is mounted across the wall 21ᵇ to insure an air-tight enclosure. The seal 23 reinforces the scored area 22.

A wall 24 is stationarily mounted across the wall 21. This wall 24 is provided with a prong 25 stamped from the material thereof and which engages the area of the wall 21ᵇ within the score line 22.

The operation of this form of the invention is as follows:

Should the contents of the can 10 become spoiled the internal pressure increases. This pressure will exert itself against the seal 23 and against the area of the wall 21ᵇ which is within the annular score 22. When a pressure sufficiently great is reached the prong 25 will puncture the wall 21ᵇ. The score 22 functions to weaken the central area of the wall 21ᵇ so that it will readily move upwards against the prong 25.

Figure 8:
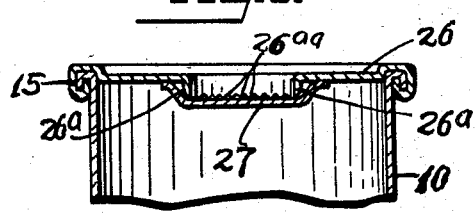
Fig. 8 is still another vertical sectional view of a can constructed in accordance with a still further modified form of the invention.

In Fig. 8 another form of the invention has been disclosed in which the hermetically sealed can 10 is provided with a wall 26 having a cylindrical inwardly directed portion 26ª. The edge 26ªª of this cylindrical portion is formed with sharpened points or with sharp irregular burr edges. A seal 27 extends across the edge 26ªª, and at its edges is mounted upon the bottom face of the wall 26.

The rough or sharp points of the edge 26ªª of the cylindrical portion 26ª are capable of puncturing the seal 27 when the total upward force against the sharp object reaches a predetermined pressure.

The can in accordance with this form of the invention will function as follows:

When the internal pressure in the can rises above a predetermined amount the seal 27 will be forced upwards against the sharpened edge 26ªª. These sharpened parts will puncture the seal.

In Fig. 9 the wall 11'' is formed with an annular score line 28 and a sharp prong 13 is centrally supported over the scored area of the wall 11. The prong 13 is shown to project downwardly from an outer cover 30 which may be removable or firmly held by a flange 32 over the seam joint 15 of the can.

In Fig. 10, the outer cover 30' is bent downwardly at 30ª and then convexed upwardly at the center area 30ᵇ.

In Fig. 11, the outer cover 30'' is formed with a concave center area 30ᶜ. In other respects, the form of the invention illustrated in Figs. 10 and 11 are similar to that shown in Fig. 9 and the various parts may be recognized by corresponding reference numerals.

In Fig. 12, the can 10 is illustrated with a lower hermetically sealed wall 33 and an upper hermetically sealed wall 34, joined to the can by the usual double seam joints 15. The upper and lower walls 34 and 33 are also joined by a centrally located vertical bar 35, soldered or otherwise secured to the upper wall 34 at 35ᵇ and to the lower wall 33 at 35ª. The upper wall 34 is formed with a suitable scoring 34ᵇ to divide off a center area 34ª so that when the total force against the walls 33 and 34 reaches a predetermined amount, the said walls will flex as indicated by the dot and dash lines, consequently the center area 34ª will break away from the remainder of the upper wall 34 at the score line 34ᵇ, and the open wall permit some of the substance to escape through the opening and thus indicate that the food within the container is poisoned.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A pre-set pressure can having a can body with an end hermetically sealed by means of a wall, an inwardly depressed portion having a circular score line of considerable depth with respect to the thickness of said wall, dividing off a circular area, said circular score member being substantially concentric with respect to the edge of said wall, a member extended across the open top of said depressed portion, a sharp prong extended inwards from said member and engaging the center of said circular area to puncture said circular arc when the pressure in said can body increases and moves said circular area towards said prong.

2. A pre-set pressure can having a can body with an end hermetically sealed by means of a wall, an inwardly depressed portion having a circular score line of considerable depth with respect to the thickness of said wall, dividing off a circular area, said circular score member being substantially concentric with respect to the edge of said wall, a member extended across the open top of said depressed portion, a sharp prong extended inwards from said member and engaging the center of said circular area to puncture said circular area when the pressure in said can body increases and moves said circular area towards said prong, and an auxiliary seal mounted on the bottom face of said wall and having a score central area in intimate contact with said circular area to move with said circular area and be punctured by said prong.

ROSARIO LO VICO.